(12) United States Patent
Fourre

(10) Patent No.: US 11,610,428 B2
(45) Date of Patent: Mar. 21, 2023

(54) METHOD FOR ACQUIRING FINGERPRINTS

(71) Applicant: IDEMIA IDENTITY & SECURITY FRANCE, Courbevoie (FR)

(72) Inventor: Joël-Yann Fourre, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 317 days.

(21) Appl. No.: 17/147,775

(22) Filed: Jan. 13, 2021

(65) Prior Publication Data
US 2021/0224501 A1 Jul. 22, 2021

(30) Foreign Application Priority Data

Jan. 21, 2020 (FR) ...................................... 2000576

(51) Int. Cl.
*G06V 40/13* (2022.01)
*G01K 7/00* (2006.01)
*G01K 7/34* (2006.01)

(52) U.S. Cl.
CPC ......... *G06V 40/1306* (2022.01); *G01K 7/003* (2013.01); *G01K 7/34* (2013.01)

(58) Field of Classification Search
CPC ......... H04B 5/00–06; G01K 7/00–427; G01K 7/003; G01K 7/34–346; G01R 19/32; G06V 40/12–1306; G06V 40/00–70; G01J 5/00–90; G01J 2005/0029–608; G06F 21/32
See application file for complete search history.

(56) References Cited

U.S. PATENT DOCUMENTS

2018/0137326 A1* 5/2018 Mainguet ........... G06V 40/1359
2020/0064901 A1* 2/2020 Almers ..................... G06F 1/10

FOREIGN PATENT DOCUMENTS

| EP | 3276585 A1 | 1/2018 |
| FR | 3044443 A1 | 6/2017 |
| FR | 3069938 A1 | 2/2019 |
| WO | 2018/203799 A1 | 11/2018 |

OTHER PUBLICATIONS

Sep. 21, 2020 Search Report issued in French Patent Application No. 2000576.

\* cited by examiner

*Primary Examiner* — Amr A Awad
*Assistant Examiner* — Aaron Midkiff
(74) *Attorney, Agent, or Firm* — Oliff PLC

(57) ABSTRACT

Method for acquiring a fingerprint, performed by a device comprising an active thermal sensor when it is electrically supplied at a distance by a terminal, said sensor comprising a plurality of pixels, each pixel comprising a pyroelectric capacitor which, when it is subjected to a variation in temperature, generates electrical charges, each pixel being associated with a heating element adapted for heating said pixel and being connected to a reading circuit able to measure the electrical charges generated by said capacitor. The method relies on a taking into account of the heating element received by each pixel of said sensor (33, 34) in order to determine when said pixel is able to provide (36) a signal that can be used for generating information representing a part of a fingerprint.

8 Claims, 4 Drawing Sheets

METHOD FOR ACQUIRING FINGERPRINTS

TECHNICAL FIELD

The invention relates to a method for acquiring information representing a fingerprint, and a device and a system implementing the method.

PRIOR ART

Faced with a resurgence of identity thefts, attempts at fraud and pirating of computer data, securing data and controlling access have become major challenges. Techniques based on a use of biometric data are reputed for their high level of reliability. Fingerprints form part of the biometric data normally used.

Some fingerprint sensors, referred to as thermal sensors hereinafter, use thermal detection means for recovering information representing a fingerprint. These thermal detection means may be pyroelectric elements, diodes, thermistors or any other thermosensitive element able to convert a variation in temperature into a variation in a parameter representing a measurable electrical property of the sensitive element such as an electrical potential at terminals of said element, an electric current generated by said element or a variation in an electrical resistance of said element.

There exist two types of thermal sensor: so-called passive thermal sensors and so-called active thermal sensors. Passive thermal sensors exploit a difference in temperature between a finger and the sensor in order to acquire information representing fingerprints. These sensors are therefore effective as long as a difference in temperature exists between the sensor and the finger but become inoperative as soon as the temperatures of the finger and of the sensor are close or even equal. In particular, if the finger remains applied to the sensor, the temperatures balance out quickly and the signal disappears. Active thermal sensors overcome this drawback by associating each pixel of said sensor with a heating element. This heating element dissipates a certain quantity of heat in the pixel. The heating of the pixel is measured after a certain acquisition time, referred to as the "integration time". When a finger is present on the sensor, the parts of the skin in contact with the sensor (the ridges of the fingerprints) absorb part of the heat received by the pixels. When air is present, and in particular at the valleys of the fingerprints, the pixels keep their heat. The heating of the pixels in the presence of a ridge is therefore lower than the heating of the pixels in the presence of air. By measuring the variation in temperature of each pixel, it is therefore possible to reconstitute a pattern of a fingerprint.

Heating elements generally use the Joule effect, which makes it possible to produce heat by passing an electric current through a conductive material. This type of heating element therefore requires an application of a voltage at its terminals by a voltage or current source. Some devices comprising an active thermal sensor can easily comprise or be connected to a stable voltage or current source. Other devices, such as chip cards, may have difficulty in integrating a stable voltage or current source, such as a cell or battery. This is because integrating a cell or battery in a chip card involves a high cost and poses recycling problems. Moreover, a chip card is not necessarily physically connected to a reading terminal that is to read information that it contains but may communicate therewith by near field communication (NFC).

NFC communication is based on a magnetic coupling between two windings placed in proximity to each other. In a so-called passive NFC communication, when a winding (also referred to as an antenna) of a chip card captures an electromagnetic field generated by a winding on a reading terminal, the winding on the chip card generates an electric current that makes it possible to supply the chip card electrically. Under the effect of the electromagnetic field produced by the reading terminal, the winding on the chip card therefore forms an electrical supply for said chip card. It is then said that the card is supplied remotely, that is to say at no time is it in physical contact with an electrical supply source. The chip card then receives an electric power dependent on the power of the field, but also on a distance between the chip card and the terminal. When the chip card comprises an active thermal sensor, the latter is supplied electrically by the electrical energy received by the NFC communication. The maximum power available for heating the heating elements of the chip card therefore depends on the distance between the card and the terminal and may vary according to movements of a user presenting the card in front of the terminal. This situation has a significant drawback since, when the chip card is presented in front of the terminal, the user does not know whether the power available for the heating of the pixels by the heating elements has been sufficient to obtain information representing the fingerprint of sufficient quality. Some chip cards activate the fingerprint sensor only when the electromagnetic field is sufficient, which means that the user must seek how to position his card with respect to the terminal in order to obtain a sufficient electromagnetic field or is caused to enter a PIN code instead of using biometric recognition.

It is desirable to overcome these drawbacks of the prior art and to allow the use of a fingerprint sensor even when the field level is low, without slowing it down when the latter is sufficient. It is in particular desirable to propose a method making it possible in particular to determine, when a user presents a chip card comprising an active thermal sensor in front of a terminal, when the heating of the pixels by the heating element has been sufficient to obtain information representing the fingerprint of sufficient quality. This method must take into account the fact that the information representing the fingerprint must be captured by the active thermal sensor within a reasonable time, i.e. as quickly as possible, in order not to impair the ergonomics of use of the chip card.

DISCLOSURE OF THE INVENTION

According to a first aspect of the invention, the invention relates to a method for acquiring information representing a fingerprint performed by a device comprising an active thermal sensor on which a body part carrying a fingerprint is placed at the time of a presentation at a distance of said device in front of a reading terminal producing an electromagnetic field able to generate an electrical supply in said device, said sensor comprising a plurality of pixels, each pixel comprising a thermosensitive element able to convert a variation in temperature into a variation in a parameter representing a measurable electrical property of said thermosensitive element, referred to as an electrical parameter, each pixel being associated with a heating element adapted for heating said pixel and being connected to a reading circuit able to measure the variations in said electrical parameter. The method comprises: for each pixel: initiating a heating-activation phase comprising: performing a first reinitialisation of the reading circuit connected to said pixel; and activating a heating of said pixel by the heating element corresponding to said pixel; ending the first reinitialisation after a predetermined heating period; ending the heating by the heating element when a heating energy produced in the pixel by said heating element reaches a predetermined heating energy; and measuring a first item of information representing variations in the electrical parameter of said pixel after a predetermined waiting period, the first item of information corresponding to a period, referred to as an integration period, lying between the end of the first initiation and the end of the predetermined waiting period; the information representing a fingerprint being obtained from said first item of information measured for each pixel.

The method of the invention therefore makes it possible to automatically determine when the heating of the pixels by the heating element has been sufficient to obtain information representing the fingerprint of sufficient quality.

According to one embodiment, following the measurement of the first item of information, the method comprises, for each pixel: performing a second reinitialisation of the reading circuit connected to said pixel; measuring a second item of information representing variations in the electrical parameter of said pixel after a period equal to the integration period following the end of the second reinitialisation; and calculating a third item of information representing variations in the electrical parameter of said pixel in the form of a difference between said first and said second item of information; the information representing the fingerprint being obtained from the third item of information calculated for each pixel.

Using a difference between the first item of information and the second item of information makes it possible to eliminate parasitic signals of the low-frequency type. According to one embodiment, the active thermal sensor comprises pixels, referred to as reference pixels, not intended to capture information representing a fingerprint part, and adapted for generating an electrical signal when a finger is present on said active thermal sensor, said signal being insensitive to a presence or not of skin on said reference pixel; and in that the heating energy produced by the heating element in each pixel intended to generate information representing a part of a fingerprint is estimated using at least one reference pixel.

According to one embodiment, the method comprises, for each pixel: measuring a voltage provided by the electrical supply of the device, fixing a supply voltage of the heating element, referred to as the heating voltage, corresponding to said pixel, at a value of no more than the voltage supplied by the electrical supply of the device; and determining that the heating energy produced in the pixel by said heating element reaches the predetermined heating energy when a period following the end of the first reinitialisation reaches a duration deduced from the heating voltage.

In this way, the energy consumed by the device always remains compatible with the energy provided by the electrical supply of said device.

According to one embodiment, the method comprises, for each pixel: measuring a voltage provided by the electrical supply of the device; fixing a value of a supply voltage of the heating element corresponding to said pixel at a predefined value; when the predefined value is lower than or equal to the voltage provided by the electrical supply of the device, determining that the heating energy produced in the pixel by said heating element reaches the predetermined heating energy when a period following the end of the first reinitialisation reaches a duration deduced from the predefined value; and ending said method when the predefined value is higher than the voltage provided by the electrical supply of the device.

According to a second aspect of the invention, the invention relates to a device comprising an active thermal sensor allowing acquisition of information representing a fingerprint when a body part carrying a fingerprint is placed on said thermal sensor, said device being adapted for being electrically supplied remotely by a reading terminal, said sensor comprising a plurality of pixels, each pixel comprising a thermosensitive element able to convert a variation in temperature into a variation in a parameter representing a measurable electrical property of said element, referred to as an electrical parameter, each pixel being associated with a heating element adapted for heating said pixel and being connected to a reading circuit able to measure the electrical charges generated by said capacitor. The device comprises: for each pixel: activation means for activating a heating of said pixel by the heating element corresponding to said pixel; reinitialisation means for reinitialising the reading circuit connected to said pixel; control means for ending the reinitialisation; control means for ending the heating by the heating element when a heating energy produced in the pixel by said heating element reaches a predetermined heating energy; and measuring means for measuring a first item of information representing a variation in the electrical parameter of said pixel after a predetermined waiting period; and obtaining means for obtaining information representing the fingerprint from said first item of information measured for each pixel of the active thermal sensor.

According to a third aspect of the invention, the invention relates to a computer program, comprising instructions for implementing, by a device, the method according to the first aspect, when said program is executed by a processor of said device.

According to a fourth aspect, the invention relates to storage means, characterised in that they store a computer program comprising instructions for implementing, by a device, the method according to the first aspect, when said program is executed by a processor of said device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention is described hereinafter in a context wherein a device implementing the invention is a chip card comprising an active thermal sensor and communicating with a reading terminal in accordance with a passive NFC communication. The invention however applies in other contexts and in particular for other devices comprising an active thermal sensor that can be supplied at a distance by an electromagnetic field.

Moreover, the invention is described hereinafter with an active thermal sensor wherein each pixel comprises a thermosensitive element of the pyroelectric capacitance type which, when it is subjected to a variation in temperature, generates an electrical charge. Other thermosensitive elements could however be used in place of pyroelectrical capacitors, such as, for example, diodes, thermistors or any other thermosensitive element able to convert a variation in temperature into a variation in a parameter representing a measurable electrical property of the sensitive element such as an electrical potential at terminals of said element, an electric current generated by said element or a variation in an electrical resistance of said element.

Figure 1:
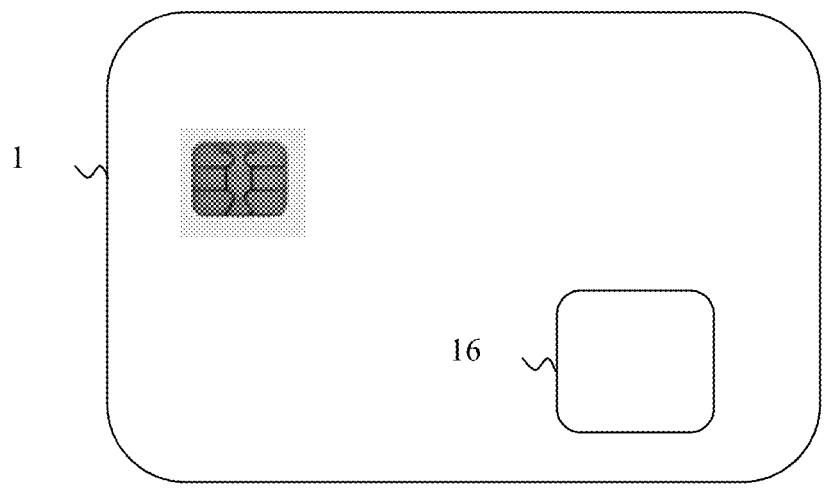
FIG. 1 illustrates schematically an example of a device implementing the invention.

FIG. 1 illustrates schematically an example of a device implementing the invention. The device of FIG. 1 is a chip card 1 comprising an active thermal sensor 16.

Figure 2:
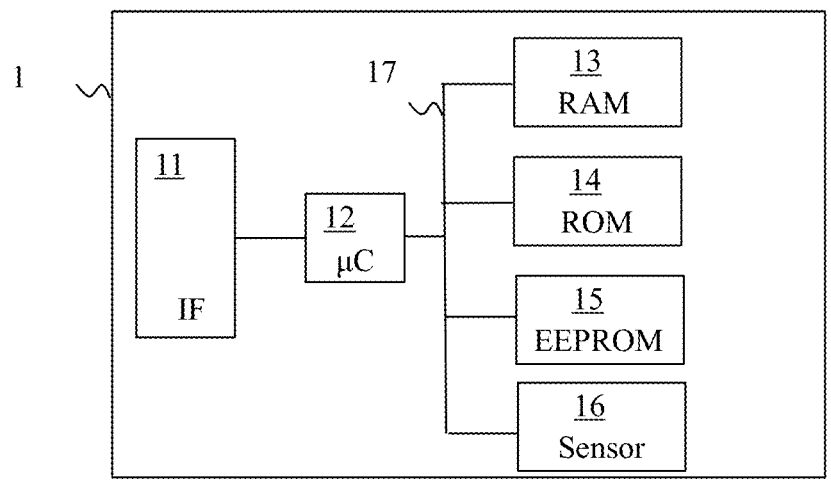
FIG. 2 illustrates schematically an example of hardware architecture of the device implementing the invention.

FIG. 2 illustrates schematically an example of hardware architecture of the device implementing the invention.

The chip card 1 comprises an interface 11 configured for connecting the chip card 1 to a reading terminal (not shown in FIG. 2). The chip card 1 is for example a bank card and the reading terminal is a payment terminal. The interface 11 is configured for making it possible to make exchanges of data between the reading terminal and the chip card 1, in particular to enable the reading terminal to send commands to the chip card 1, and also to enable the reading terminal to supply the chip card with electrical energy. In one embodiment, the interface 11 is an NFC interface.

The chip card 1 further comprises a processor, typically in the form of a microcontroller 12, a microprocessor or a sequencer (i.e. a programmable component of the CPLD (complex programmable logic device)) type responsible for performing processing operations in the chip card 1: calculations, data transfers, etc.

The chip card 1 further comprises a random access memory RAM 13, a read only memory ROM 14 and a non-volatile memory, such as for example a EEPROM (Electrically Erasable Programmable ROM) 15.

Moreover, the chip card 1 comprises the active thermal sensor 16. The random access memory 13, the read only memory 14, the non-volatile memory 15 and the active thermal sensor 16 are connected to the microcontroller 12 by a communication bus 17.

The read only memory 14 typically contains instructions causing the implementation of a JCRE execution environment in the chip card 1, relying on the random access memory 13. The random access memory 13 is used for temporarily storing data, such as variables and intermediate calculation results.

The non-volatile memory 15 contains a set of instructions corresponding to functions offered by libraries stored on the chip card 1. These functions are grouped in a plurality of software modules.

When the chip card 1 is supplied with energy by the terminal via the interface 11, the microcontroller 12 is capable of executing instructions from the read only memory 14 and/or from the non-volatile memory 15. These instructions make it possible in particular to demand an acquisition of information representing a fingerprint by the active thermal sensor 16 and to execute the method described hereinafter in relation to FIG. 3. FIG. 4 illustrates schematically a view in cross section of a part of a pixel of the active thermal sensor included in the device of FIG. 1.

The pixels of the active thermal sensor 16 are disposed in the form of a matrix of a plurality of rows and a plurality of columns of pixels. In this matrix, a pitch between the pixels is for example between 50 μm and 100 μm. For example, in the case of an active thermal sensor 16 of resolution 500 dpi (dots per inch), the pitch between the pixels is 50.8 μm.

The pixel shown in FIG. 4 is produced on a substrate 100. The substrate 100 is for example a flexible substrate such as PEN (polyethylene naphthalate) or PI (polyimide).

The pixel comprises thermal measurement means comprising a thermosensitive element. In one embodiment, the sensitive element is a pyroelectric capacitor. This pyroelectric capacitor comprises a portion 102 made from pyroelectric material disposed between a bottom electrode 101 and a top electrode 103.

The pyroelectric material is for example a polymer comprising PVDF (polyvinylidene fluoride), such as P(VDF-TrFE), which we refer to hereinafter simply as PVDF. The electrodes 101 and 103 each comprise at least one electrically conductive material, such as for example a metal material such as titanium, molybdenum, aluminium or copper, a conductive oxide such as ITO (indium tin oxide) or a conductive polymer such as PEDOT:PSS.

On top of the pyroelectric capacitor there is a dielectric layer 105, for example made from polymer material serving as an electrical insulator between the pyroelectric capacitor and a layer of heating element 105. The layer of heating element 105 typically comprises a metal material. The heating of the layer of heating element 105 is obtained by circulating an electric current in the heating element. The layer of heating element 105 behaves as a resistance of known and constant value. When a current circulates, the heating element produces heat by Joule effect.

A protective layer 106 protects the pixel. The protective layer is typically made from polymer (acrylate or siloxane) containing inorganic particles (for example titanium dioxide) in order to offer protection against scratches.

The order of magnitude of the thickness of each layer in the stack of layers forming the pixel in FIG. 4 is around 1 μm or even around 10 to 100 nm for certain layers.

So that the PVDF of the portion 102 acquires its pyroelectric (and also piezoelectric) properties, this material is, once for the entire service life of the pyroelectric capacitor, subjected to an electric field of approximately 100 volts per μm of thickness of PVDF. The molecules of the PVDF orient themselves and thus remain oriented even when the PVDF is no longer subjected to the electric field. The PVDF of the portion 102 is biased by applying an initial biasing voltage to the terminals of the electrodes 101 and 103. After this initial biasing, when the portion 102 is subjected to a variation in temperature, this variation in temperature causes an appearance of an electric field generating charges between the electrodes 101 and 103.

The portion 102 and the electrodes 101 and 103 forming a pyroelectric capacitor, the charges generated cause a difference in electrical potential between the electrodes 101 and 103. When the difference in potential between the two electrodes is fixed, the charges generated flow towards a circuit, hereinafter referred to as a reading circuit, which we shall describe in relation to FIGS. 5 and 6, forming a current which, by integration, makes it possible to measure the number of charges generated and thus to obtain information representing a variation in temperature in the pixel.

For a pyroelectric material, the charges generated are $Q = \gamma \cdot S \cdot \delta_T$, with $\gamma$ a pyroelectric coefficient (around 29 μCm$^{-2}$ K$^{-1}$ for P(VDF-TrFE)), S a surface area of the pyroelectric capacitor of the pixel and $\delta_T$ a variation in temperature.

Figure 5:
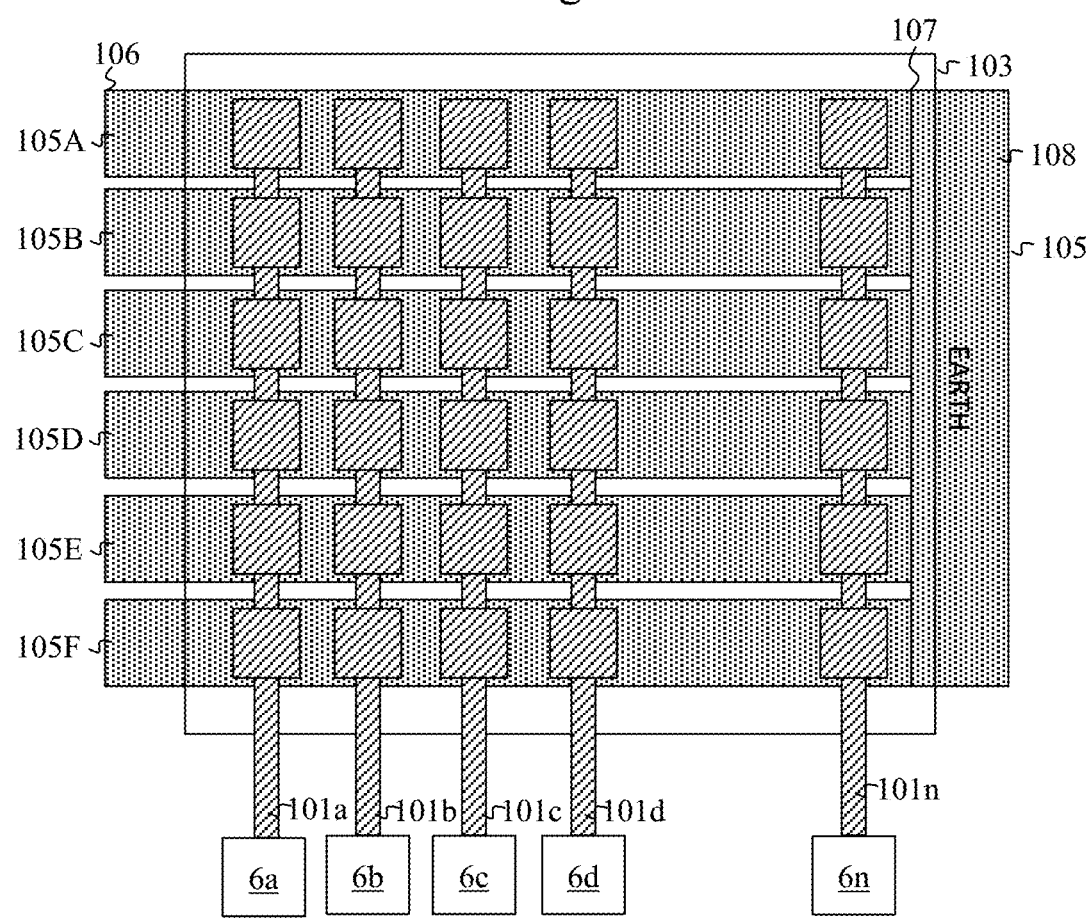
FIG. 5 illustrates schematically a view from below of a part of the active thermal sensor.

FIG. 5 illustrates schematically a view from below of a part of the active thermal sensor 16.

In FIG. 5, among the layers of the stack of layers described in relation to FIG. 4, we have illustrated only elements of the two electrodes 101 and 103 and of the layer of heating element 105. The top electrode 103 is shown transparent so that it is possible to perceive the heating element that is situated behind. In order to simplify the understanding of FIG. 5, the pixels are shown in the form of squares. It will be noted that, in this active thermal sensor, the pixels are organised in a matrix.

As can be seen in FIG. 5, the pixels are organised in columns. In one embodiment, the bottom electrodes of the pixels in the same column (101a, 101b, 101c, 101d and 101n) are electrically connected to each other. It is therefore noted that the bottom electrodes of each column of pixels are independent.

The bottom electrode of each column of pixels is connected to a reading circuit common to all the pixels of the same column. For example, the bottom electrode 101a (and respectively 101b, 101c, 101d and 101n) is connected to the reading circuit 6a (and respectively 6b, 6c, 6d and 6n). We describe hereinafter an example of a reading circuit in relation to FIG. 6.

The portions 102 of pyroelectric material (not shown in FIG. 5) of all the pixels of the active thermal sensor 16 are for example produced in the form of a single layer of pyroelectric material covering all the bottom electrodes of the pixels.

In a similar manner, the top electrodes 103 of each pixel are produced in the form of a single layer of electrically conductive material covering the layer of pyroelectric material, and therefore all the bottom electrodes of the pixels.

It should be noted that the pyroelectric capacitance of a pixel is defined by the portion of PVDF included opposite the conductive portions of a row and of a column.

The layer of heating element 105 is formed by electrically conductive portions 105A to 105F and each common to all the pixels of the same row of pixels.

Each of the portions 105A to 105F forming the heating elements of a row of pixels comprises two ends 106 and 107 on which a voltage, referred to as the heating voltage, is intended to be applied. One of these two ends is for example connected to earth (for example the end 107 of the portion 105A) and a non-zero heating voltage is applied to the other of these two ends (for example the end 106 of the portion 105A) by heating means for example formed by an electrical connection applying a voltage to this end. A current then flows from the end 106 to the end 107, causing heating by Joule effect of the portion 105A, and therefore heating of the pyroelectric material of the portion 102 of all the pixels in the row of pixels that is heated by the portion 105A.

In the example in FIG. 5, the ends 107 of the portions 105A to 105F are connected to another conductive portion 108 that is connected to earth.

In the active thermal sensor 16, each portion 105A to 105F makes it possible to heat each row of pixels independently of each other. When a row of pixels is heated, each reading circuit connected to a column measures the charges generated by the heated pixel in said column.

It should be noted that, if the thickness of all the layers 101, 102, 103, 104, 105 and 106 is small compared with the distance between two pixels, the heat exchanges between two adjacent pixels are negligible. If such is not the case, an additional processing of the signal acquired can be performed in order to take account of the thermal exchanges between adjacent pixels.

The invention is however adapted to other active thermal sensors that would for example comprise only one reading circuit for all the pixels of the sensor or one reading circuit for each pixel, or which would make it possible to heat each pixel independently or all the pixels at the same time.

Figure 6:
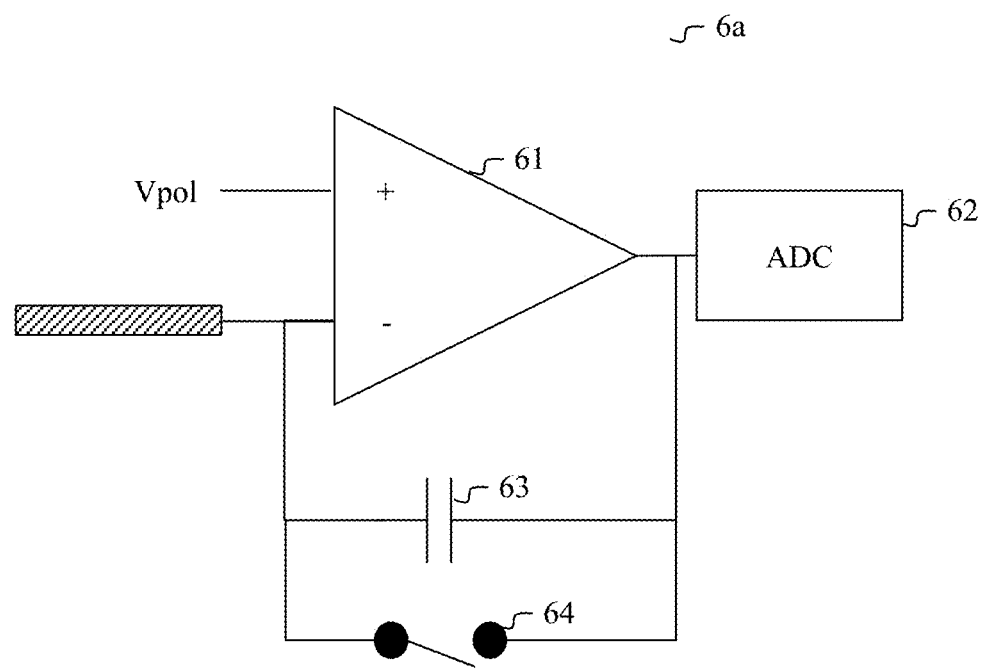
FIG. 6 illustrates schematically an example of a reading circuit associated with a column of pixels of the active thermal sensor.

FIG. 6 illustrates schematically an example of a reading circuit associated with a column of pixels of the active thermal sensor 16.

FIG. 6 takes the example of the reading circuit 6a connected to the bottom electrode 101a. All the other reading circuits of FIG. 5 are identical.

The bottom electrode 101a is connected to an input of the circuit 6a corresponding to an inverting input of an operational amplifier 61. A biasing electrical potential Vpol is applied to a non-inverting input of the operational amplifier 61.

The operational amplifier 61 comprises an output looped back onto the inverting input by means of a capacitor, referred to as an integration capacitor, 63. A switch 64 is connected in parallel to the integration capacitor 63 and makes it possible to short-circuit this capacitor. The output of the operational amplifier is also connected to an analogue to digital converter 62.

Figure 3:
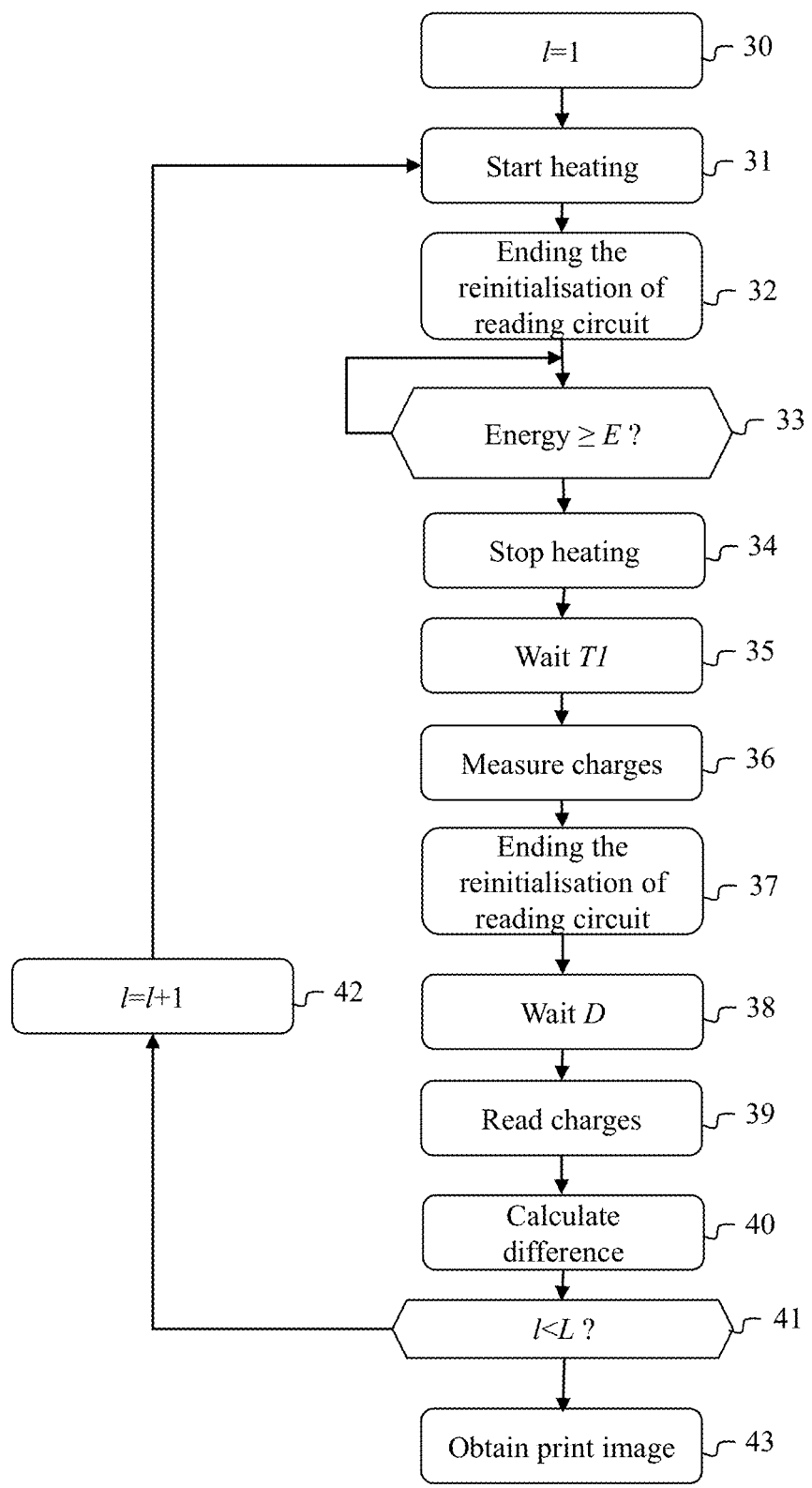
FIG. 3 illustrates schematically an example of a method for acquiring information representing a fingerprint according to the invention.
Figure 4:
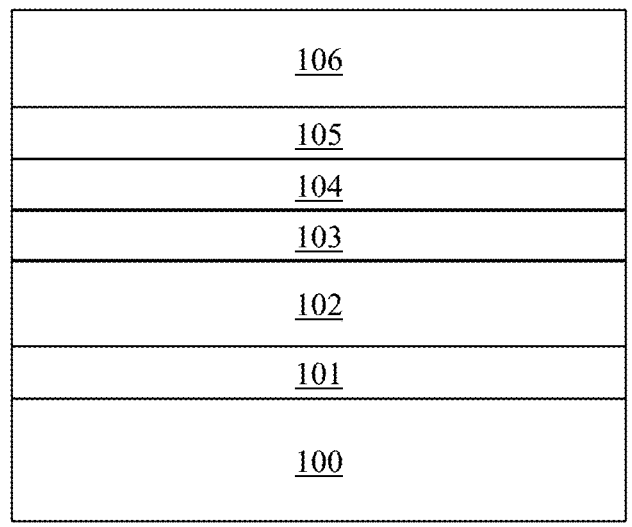
FIG. 4 illustrates schematically a view in cross section of a part of a pixel of an active thermal sensor included in the device of FIG. 1.

FIG. 3 illustrates schematically an example of a method for acquiring information representing a fingerprint according to the invention.

The acquisition method is executed under the control of the microcontroller 12, when the chip card 1 is in proximity to a terminal able to supply the chip card 1 by NFC.

As seen above, the active thermal sensor 16 is adapted so that each row of pixels is heated independently of the other rows. In one embodiment, the rows of pixels are numbered from 1 to L and are run through one by one.

In a step 30, the microcontroller 12 initialises a variable l, representing a row number, to 1. In the step 30, the microcontroller 12 reinitialises the reading circuit connected to each pixel in the row number l. Reinitialisation is obtained by closing the switch 64 of each reading circuit. In this way, the integration capacitor 63 is emptied of all the charges that it would have been able to accumulate.

In a step 31, the microcontroller 12 activates the heating of the row number l. It will be noted that the reinitialisation of the reading circuit connected to each pixel in the row number l could be done during heating (i.e. during the step 31).

In a step 32, the microcontroller 12 ends the reinitialisation of the reading circuit connected to each pixel in the row number l by opening the corresponding switch 64 after a predetermined heating period D1. The predetermined heating period D1 corresponds to a period of stabilisation of the components and electrical circuits of the active thermal sensor 16 following disturbances related to the start of the heating.

In an active thermal sensor, when a finger is placed on said sensor, each pixel produces an electrical signal representing part of a fingerprint. The part of the fingerprint corresponds to a point. It is necessary for each signal to have reached a sufficient amplitude for this signal to be usable, that is to say for it to have reached a sufficiently great amplitude compared with a noise in the system. When a chip card is supplied at a distance by a reading circuit by NFC, the electrical energy received by the chip card is dependent on the distance between the chip card and the reading terminal. The amplitude of the signal produced by the active thermal sensor of the card being dependent on the energy dissipated in the heating element, and this being limited by the electrical energy received by the chip card, it is very difficult to know if and when the amplitude of the signal produced by each pixel of the active thermal sensor reaches a sufficient amplitude. This is because the distance between the chip card and the reading terminal is unknown and may vary. The applicant has observed that, in an active thermal sensor, each pixel produces a signal the amplitude of which is proportional to a heating energy diffused in said pixel. Moreover, over a range of time from 0.1 to 20 milliseconds, this amplitude depends very little on the time during which this energy was diffused. This property is used in a following step 33 in order to determine when the signals produced by the pixels of the active thermal sensor 16 can be used (i.e. have a sufficient amplitude) to perform a recognition of fingerprints. During the step 33, the microcontroller 12 waits for the heating energy produced in each pixel in the row of pixels number l by the portion of the layer of heating element 105 corresponding to said row to reach a predetermined heating energy E. This predetermined heating energy E was determined during a prior training phase. The predetermined heating energy E makes it possible to obtain a predetermined signal level without a finger applied to the active thermal sensor 16. It is supposed here that each heating element behaves as an electrical resistance of known value R. Knowing this resistance value R, it is possible to know the electrical power P dissipated by the heating element by measuring either the current flowing in the heating element, or the voltage at the terminals of the heating element. The heating energy Ec dissipated by the heating element is then the integral of the power measured over a measurement period. In one embodiment, the microcontroller 12 periodically measures, with a period $\Delta t$, the heating voltage U at the terminals of the heating element. From the heating voltage U, the microcontroller 12 determines an elementary heating energy Ei, $$i = \Delta t \times \frac{U^2}{R}.$$

The heating energy Ec is a sum of the elementary heating energies Ei since the end of the reinitialisation of the reading circuit during the step 32.

It should be noted that controlling the energy in each pixel is equivalent to controlling the energy of a heating band. This is because the ratio between these two energies is known and is dependent solely on the geometry of the conductive portion. More precisely, it is equal to the resistance of the conductive heating portion opposite the pixel divided by the total resistance of the conductive portion of the row.

During the step 33, for each column of pixels, because of the opening of the switch 64, the electrical charges generated by the pyroelectric capacitor of the heated pixel of the column accumulate in the integration capacitor 63. As seen above, the charges received by the integration capacitor 63 of a reading circuit are a consequence of a variation in temperature of the pyroelectric capacitor of a pixel connected to this reading circuit. An electrical voltage Vout is then obtained at the output of the operational amplifier 61:

Vout=$Q$·Cref+$V$pol where Q corresponds to the electrical charges generated by the pyroelectric capacitor and Cref is a value of the integration capacitor 63. The voltage Vout is therefore proportional to the variation in temperature and is information representing the fingerprint. The electrical voltage Vout is read and sampled by the analogue to digital converter 62.

When the heating energy Ec produced in each pixel on the row of pixels heated by said portion of the layer of heating element reaches the predetermined heating energy E, in a step 34 the microcontroller ends the heating by said portion.

In a step 35, the microcontroller 12 waits for a waiting period T1 following the end of the heating. The waiting period T1 represents a period enabling the heat produced by the heating element to reach the surface of the sensor, that is to say the protective layer 106.

This waiting period T1 makes it possible to obtain amplitudes for the signals produced by the pixels that are maximum. The waiting period T1 was determined, for example, during the training phase.

In a step 36, the microcontroller 12 measures a voltage $Vout_1$ at the output of the analogue to digital converter 62 of each reading circuit. The voltage $Vout_1$ is a first item of information representing charges generated by the pyroelectric capacitor of the pixel corresponding to the reading circuit. This first item of information corresponds to the charges produced by the pyroelectric capacitor during a period of duration D lying between the end of the reinitialisation of the reading circuit connected to each pixel in the row number l (step 32) and the end of the waiting period T1 (step 35). Once the voltage $Vout_1$ has been measured, the microcontroller 12 closes the switch 64 in order to reinitialise the reading circuit connected to each pixel in the row of pixels number l.

In a step 37, the microcontroller 12 ends the reinitialisation of the reading circuit connected to each pixel in the row of pixels number l by opening the switch 64.

In a step 38, the microcontroller 12 waits for a period of duration D following the end of the reinitialisation of the step 37.

In a step 39, the microcontroller 12 measures a voltage $Vout_2$ at the output of the analogue to digital converter 62 of each reading circuit. The voltage $Vout_2$ is a second item of information representing the charges generated by the pyroelectric capacitor of the pixel corresponding to the reading circuit. This second item of information corresponds to the charges produced by the pyroelectric capacitor without heating. The measurement of the voltage $Vout_2$ is done during the cooling of the active thermal sensor 16, at a moment when sufficient residual heat remains in the sensor to obtain a signal that can be used by each previously heated pixel.

In a step 40, the microcontroller 12 calculates a difference DIFF between the voltage $Vout_1$ and the voltage $Vout_2$.

DIFF=$Vout_1$−$Vout_2$

Calculating the difference DIFF makes it possible to eliminate the voltage $Vout_1$ of any parasitic signals of the low frequency type. The difference DIFF is a third item of information representing the charges generated by the pyroelectric capacitor of the pixel corresponding to the reading circuit.

At this stage, the microcontroller 12 obtains a value DIFF for each pixel in the heated row of pixels.

In a step 41, the microcontroller checks whether each row of pixels of the active thermal sensor 16 has been processed (i.e. whether the variable l is smaller than the number of rows L).

If l<L, the step 41 is followed by a step 42 during which the variable l is incremented by one unit.

When all the rows of pixels have been processed (i.e. l=L), the microcontroller 12 has obtained a value DIFF for each pixel of the active thermal sensor 16. All the values DIFF obtained form information representing a fingerprint from which the microcontroller 12 can form an image of the fingerprint in a step 43.

In one embodiment of the method described in relation to FIG. 3, the steps 37 to 40 are not performed. In this embodiment, the microcontroller 12 obtains solely a voltage $Vout_1$ for each pixel of the active thermal sensor 16, each voltage $Vout_1$ being information representing the charges generated by the pyroelectric capacitor of said pixel. All the voltages $Vout_1$ obtained then form the information representing a fingerprint from which the microcontroller 12 can form an image of the fingerprint in the step 43.

In the embodiment described in relation to FIG. 3, the microcontroller 12 must wait until each pixel in a heated row of pixels has received heating energy equal to the predetermined heating energy E in order, for each pixel in the row, to proceed with the measurement of a value representing a part of the fingerprint (i.e. $Vout_1$ or DIFF). When a finger is placed on the active thermal sensor 16, the electrical signal produced by each pixel is dependent on the presence of air or skin on said pixel. Thus, even if it is heated in the same way, a pixel in contact with the skin produces a different electrical signal from a pixel in contact with air. This is moreover the principle used in thermal sensors in order to obtain a fingerprint image. During heating, a pixel in contact with the skin produces an electrical signal with a lower amplitude than a pixel in contact with air. This is because, since the skin absorbs part of the heat produced by a heating element, the variation in temperature of a pixel in contact with the skin is smaller than the variation in temperature of a pixel in contact with air.

In one embodiment, the heating energy received by the pixels is not measured for each pixel but deduced from the heating energy received by reference pixels. Thus the active thermal sensor 16 comprises, for example for each row of pixels, at least one reference pixel able to generate an electrical signal when a finger is present on said sensor insensitive to the presence or not of skin on said reference pixel. These reference pixels, generally situated at the end of a row of pixels, are therefore not intended to capture information representing a fingerprint part, but only to allow a measurement of the heating energy received by the other pixels in the row. The reference pixels are for example covered with a layer of thermally insulating material on which the finger is placed. When the microcontroller 12 determines that a reference pixel in a row of pixels has received a heating energy Ec equal to the predetermined heating energy E, it deduces from this that all the other pixels in the heated row of pixels have received the same heating energy. Up until now, we have considered that the heating energy emitted by each heating element depended solely on the electrical energy received by the chip card coming from the electrical supply by NFC. In practice, the microcontroller 12 comprises means for controlling the heating power generated by the heating elements. These control means make it possible to prevent the electrical energy consumed by the chip card (and in particular the heating energy) exceeding the electrical energy provided by the electrical supply of the chip card (that is to say provided by the winding on the chip card), referred to as NFC energy. This is because an exceeding of the NFC energy would cause an abrupt drop in voltage in the chip card and therefore a failure of each process taking place in the chip card. In one embodiment, during the step 31, the microcontroller 12 measures a voltage $U_{bob}$ representing the voltage at the terminals of the winding on the chip card. The microcontroller 12 compares this voltage $U_{bob}$ with a predetermined voltage $U_{min}$. If $U_{min} > U_{bob}$, the microcontroller 12 considers that the electrical energy provided by the winding on the chip card is too low to allow acquisition of effective fingerprint information and ends the method of FIG. 3.

If $U_{bob} \geq U_{min}$, the microcontroller 12 next gradually, for example every 5 μs, increases the heating voltage U at the end 106 of each portion 105A to 105F until a predetermined voltage $U_H$ less than $U_{min}$ is reached, or until the voltage $U_{bob}$ becomes less than $U_{min}$. This is because, the more the heating voltage increases, the more the consumed power increases, the more the current in the winding increases and therefore the more the voltage at the terminals of the coil decreases. By controlling the heating voltage, the consumed power is controlled. This is because, if the consumed power were too high, the voltage at the terminals of the winding could decrease to the point that the microcontroller is no longer sufficiently supplied and the transaction fails. Thus, after each increase in the heating voltage, the microcontroller once again measures a voltage $U_{bob}$ and, if this is less than $U_{min}$, the microcontroller ends the process of increasing the heating voltage U. In this way, the electrical energy consumed by the chip card is always less than or equal to the NFC energy. By measuring the voltage $U_{bob}$ and gradually increasing the heating voltage U, it is thus possible to control the heating power generated by the heating elements used by the microcontroller 12.

Knowing in this way the heating voltage, the microcontroller 12 can deduce therefrom the heating power received by the heating power on each portion 105A to 105F and thus a period T2 necessary for each pixel to receive the predetermined heating energy E with such a heating power P. This is because T2=E/P. In the step 33, the microcontroller 12 waits for the period T2 following the end of the reinitialisation of the step 32 and ends the heating in the step 34 when the period T2 is achieved.

In another embodiment, when the means for controlling the heating power are used in the step 31, the microcontroller 12 checks that a predefined voltage $U_{max}$ is less than or equal to the voltage $U_{bob}$. If $U_{max} \leq U_{bob}$, the microcontroller gradually increases the heating voltage at the end 106 of each portion 105A to 105F until a predetermined voltage $U_h < U_{max}$ is reached. In this case, the period T2 necessary for each pixel to receive the predetermined heating energy E is predefined since it depends on the voltage $U_{max}$, which is itself predefined. In the step 33, the microcontroller 12 waits for the period T2 following the end of the reinitialisation of the step 32 and ends the heating during the step 34 when the period T2 is reached. If $U_{max} > U_{bob}$, the microcontroller 12 considers that the electrical energy provided by the winding on the chip card is too low to allow acquisition of effective fingerprint information and ends the method of FIG. 3.

In one embodiment, the heating periods are around 100 μs to 5 ms and the waiting period T1 is around a few hundreds of microseconds. In one embodiment, the heating energy takes values situated between 20 and 100 nJ per pixel.

In one embodiment, a row of pixels comprises 128 pixels, with a resistance of 300 ohms over the whole of the length thereof. The row is then heated with powers of around 5 to 20 mW, at heating voltages of around 1.2 to 2.5 V.

The invention claimed is:

1. A method for acquiring information representing a fingerprint performed by a device comprising an active thermal sensor on which a body part carrying a fingerprint is placed at the time of a presentation at a distance of said device in front of a reading terminal producing an electromagnetic field able to generate an electrical supply in said device, said sensor comprising a plurality of pixels, each pixel comprising a thermosensitive element able to convert a variation in temperature into a variation in a parameter representing a measurable electrical property of said thermosensitive element, referred to as an electrical parameter, each pixel being associated with a heating element adapted for heating said pixel and being connected to a reading circuit able to measure the variations in said electrical parameter, the method comprising:

for each pixel:
initiating a heating-activation phase comprising: performing a first reinitialisation of the reading circuit connected to said pixel; and activating a heating of said pixel by the heating element corresponding to said pixel;
ending the first reinitialisation after a predetermined heating period;
ending the heating by the heating element when a heating energy produced in the pixel by said heating element reaches a predetermined heating energy;
measuring a first item of information representing variations in the electrical parameter of said pixel after a predetermined waiting period, the first item of information corresponding to a period, referred to as an integration period, lying between the end of the first initiation and the end of the predetermined waiting period;
performing a second reinitialisation of the reading circuit connected to said pixel;
measuring, without heating by the heating element, a second item of information representing variations in the electrical parameter of said pixel after a period equal to the integration period following the end of the second reinitialisation; and
calculating a third item of information representing variations in the electrical parameter of said pixel in the form of a difference between said first and said second item of information;
the information representing the fingerprint being obtained from the third item of information calculated for each pixel.

2. The method according to claim 1, wherein the active thermal sensor comprises pixels, referred to as reference pixels, not intended to capture information representing a fingerprint part, and adapted for generating an electrical signal when a finger is present on said active thermal sensor, said signal being insensitive to a presence or not of skin on said reference pixel; and wherein the heating energy produced by the heating element in each pixel intended to generate information representing a part of a fingerprint is estimated using at least one reference pixel.

3. The method according to claim 1, wherein ending the heating by the heating element when a heating energy produced in the pixel by said heating element reaches a predetermined heating energy comprises:
periodically measuring, by the microcontroller, a heating voltage at the terminals of the heating element;
calculating said heating element produced in the pixel by said heating element from said heating voltage measured periodically at the terminals of the heating element; and
ending the heating by the heating element when the heating energy calculated reaches said predetermined heating energy.

4. The method according to claim 1, wherein the method comprises, for each pixel:
measuring a voltage provided by the electrical supply of the device;
fixing a supply voltage of the heating element, referred to as the heating voltage, corresponding to said pixel, at a value of no more than the voltage supplied by the electrical supply of the device; and
determining that the heating energy produced in the pixel by said heating element reaches the predetermined heating energy when a period following the end of the first reinitialisation reaches a duration deduced from the heating voltage.

5. The method according to claim 1, said method comprising,
for each pixel:
gradually increasing a voltage U of supplying the heating element, referred to as the heating voltage, corresponding to said pixel, until a predetermined voltage $U_H$ lower than a predetermined minimum value $U_{min}$ is reached or until a voltage $U_{bob}$ provided by the electrical supply of the device becomes lower than said predetermined minimum value;
determining that the heating energy produced in the pixel by said heating element reaches the predetermined heating energy when a period following the end of the first reinitialisation reaches a duration deduced from the heating voltage thus increased.

6. The method according to claim 1, wherein the method comprises, for each pixel:
measuring a voltage provided by the electrical supply of the device;
fixing a value of a supply voltage of the heating element corresponding to said pixel at a predefined value;
when the predefined value is lower than or equal to the voltage provided by the electrical supply of the device, determining that the heating energy produced in the pixel by said heating element reaches the predetermined heating energy when a period following the end of the first reinitialisation reaches a duration deduced from the predefined value; and
ending said method when the predefined value is higher than the voltage provided by the electrical supply of the device.

7. A non-transitory storage medium storing a computer program comprising instructions for implementing, by a device, the method according to claim 1, when said program is executed by a processor of said device.

8. A device comprising an active thermal sensor allowing acquisition of information representing a fingerprint when a body part carrying a fingerprint is placed on said thermal sensor, said device being adapted for being electrically supplied at a distance by a reading terminal producing an electromagnetic field, said sensor comprising a plurality of pixels, each pixel comprising a thermosensitive element able to convert a variation in temperature into a variation in a parameter representing a measurable electrical property of said thermosensitive element, referred to as an electrical parameter, each pixel being associated with a heating element adapted for heating said pixel and being connected to a reading circuit able to measure the variations in said electrical parameter, the device being configured to:

for each pixel:
initiate a heating-activation phase comprising: performing a first reinitialisation of the reading circuit connected to said pixel; and activating a heating of said pixel by the heating element corresponding to said pixel;
end the first reinitialisation after a predetermined heating period;

end the heating by the heating element when a heating energy produced in the pixel by said heating element reaches a predetermined heating energy;

measure a first item of information representing variations in the electrical parameter of said pixel after a predetermined waiting period, the first item of information corresponding to a period, referred to as an integration period, lying between the end of the first initiation and the end of the predetermined waiting period;

perform a second reinitialisation of the reading circuit connected to said pixel;

measure, without heating by the heating element, a second item of information representing variations in the electrical parameter of said pixel after a period equal to the integration period following the end of the second reinitialisation; and calculate a third item of information representing variations in the electrical parameter of said pixel in the form of a difference between said first and said second item of information;

the information representing the fingerprint being obtained from the third item of information calculated for each pixel.

\* \* \* \* \*